United States Patent
Ogawa et al.

(10) Patent No.: US 6,271,891 B1
(45) Date of Patent: Aug. 7, 2001

(54) VIDEO SIGNAL PROCESSING CIRCUIT PROVIDING OPTIMUM SIGNAL LEVEL FOR INVERSE GAMMA CORRECTION

(75) Inventors: Shuji Ogawa; Hirofumi Kawaguchi; Nozomu Kikuchi; Junichi Usui; Masayuki Takeda, all of Fukuroi (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/335,678

(22) Filed: Jun. 18, 1999

(30) Foreign Application Priority Data

Jun. 19, 1998 (JP) ................................................ 10-189922

(51) Int. Cl.[7] .......................... H04N 5/202; H04N 5/20; H04N 9/64; G03F 3/08; G06K 9/40
(52) U.S. Cl. ....................... 348/674; 348/674; 348/675; 348/676; 348/677; 348/254; 348/255; 358/519; 382/274
(58) Field of Search .................................... 348/674, 675, 348/676, 677, 254, 255, 256; 358/519; 382/274

(56) References Cited

U.S. PATENT DOCUMENTS

| | | | | |
|---|---|---|---|---|
| 5,092,331 | * | 3/1992 | Nakamura et al. | 128/634 |
| 5,311,297 | * | 5/1994 | Seki et al. | 348/675 |
| 5,444,518 | * | 8/1995 | Hashiguchi et al. | 355/201 |
| 5,512,940 | * | 4/1996 | Takasugi et al. | 348/71 |
| 5,515,449 | * | 5/1996 | Tsuruoka et al. | 382/128 |
| 5,818,521 | * | 10/1998 | Heida | 348/222 |
| 5,859,951 | * | 1/1999 | Aihara et al. | 386/107 |
| 5,956,416 | * | 9/1999 | Tsuruoka et al. | 382/128 |

FOREIGN PATENT DOCUMENTS

| | | |
|---|---|---|
| 0 614 321 A2 | 9/1994 | (EP) . |
| 0 614 321 A3 | 9/1994 | (EP) . |
| 0 662 774 A1 | 7/1995 | (EP) . |
| 0 823 698 A1 | 11/1998 | (EP) . |

\* cited by examiner

Primary Examiner—John K. Peng
Assistant Examiner—Paulos Natnael
(74) Attorney, Agent, or Firm—Morgan, Lewis & Bockius LLP

(57) ABSTRACT

A video signal processing circuit in which nearly 100% of a largest possible dynamic range can be used, desired contrast is obtained, and desired brightness characteristics are obtained by an increasing in luminance of a screen. The circuit has an RGB amplifier which amplifies three primary color video signals R, G, and B by a predetermined gain and in which the gain is controlled by a gain control signal, A/D converters for converting analog three primary color video signals which are generated from the RGB amplifier into digital signals respectively, inverse gamma correcting circuits for effecting an inverse gamma correction to the three primary color digital video signals respectively, an OR circuit and a peak holding circuit for detecting peak levels of the analog three primary color signals, and a gain control signal generator for generating a gain control signal in accordance with the peak levels. When the peak levels are equal to or larger than a predetermined value, the gain control signal generator supplies the gain control signal to control the RGB amplifier so as to set the level of each of the three primary color digital video signals generated by the A/D converters at a peak value.

5 Claims, 4 Drawing Sheets

VIDEO SIGNAL PROCESSING CIRCUIT PROVIDING OPTIMUM SIGNAL LEVEL FOR INVERSE GAMMA CORRECTION

BACKGROUND OF THE INVENTION

1. Field of the Invention

The present Invention relates to a video signal processing circuit having an inverse gamma correcting circuit for effecting an inverse gamma correction to three primary color input video signals or three primary color digital video signals, respectively.

2. Description of Related Art

Gamma correction is commonly effected to a video signal. When processing such a video signal by a signal processing circuit and displaying the processed signal on a display apparatus, it is general to use an inverse gamma correcting circuit for performing a correction opposite to the gamma correction provided in the signal processing circuit.

FIG. 1 shows the structure of a video signal processing circuit conventionally used for displaying video signals onto a plasma display panel (hereinafter, referred to as PDP). An analog luminance signal Y and first and second analog color difference signals (B-Y) and (R-Y) indicative of the video signals are supplied to a matrix circuit 1 by which analog three primary color video signals of red (R), green (G), and blue (B) are generated. The analog three primary color video signals RGB are supplied to analog/digital converters (hereinafter, referred to as A/D converters) 3r, 3g, and 3b and are converted to digital signals having a predetermined number of bits, respectively. The three primary color digital video signals are supplied to inverse gamma correcting circuits 4r, 4g, and 4b wherein the input signals are processed by an inverse gamma correction operation, thereby substantially linear three primary color video signals Rout, Gout, and Bout are produced. The three primary color video signals are then supplied to the PDP and an image corresponding to the video signals is displayed.

In the conventional structure described above, characteristics of the output signals are as shown in FIG. 2 with respect to the three primary color digital video signals RGB supplied to the inverse gamma correcting circuits 4r, 4g, and 4b. That is, the output signal characteristics with respect to the input three primary color digital video signals are in the form of characteristics of an exponential function or characteristics which are approximate to them.

In this conventional circuit, since input/output characteristics of the inverse gamma correcting circuits 4r, 4g, and 4b are of exponential function characteristics or characteristics approximate to them as described above, if a maximum dynamic range of the A/D converters 3r, 3g, and 3b to which the input signals of the inverse gamma correcting circuits are supplied is not completely used, the contrast of the image which is displayed on the PDP deteriorates in the manner of an exponential function. More specifically, when each of the A/D converters 3r, 3g, and 3b produces, for example, 8 bit data, the dynamic range will be a range from "0" to "255". If, however, the maximum signal level of the input video signals to be displayed, which are output from the A/D converter 3r, 3g, and 3b is, for example, at a level "Da" in FIG. 2, the dynamic range will be a range from "0" to "Da" which is smaller than 100% of the broadest range. In this way, a reduction of dynamic range occurs. Consequently, it becomes difficult to obtain desired contrast. In such a case, the luminance of the screen will be reduced to render the whole screen dark, so that it also makes difficult to obtain desired brightness characteristics.

OBJECTS AND SUMMARY OF THE INVENTION

The invention has been made in view of the above problems and an object of the invention is to provide a video signal processing circuit which can produce a signal having a dynamic range extended nearly to 100% of its capability, so that a desired contrast can be obtained, and desired brightness characteristics can be obtained by an increase in the maximum luminance of the screen.

In order to solve the above problems, according to a first aspect of the invention, there is provided a video signal processing circuit having inverse gamma correcting circuits for effecting an inverse gamma correction to three primary color input video signals according to three primary color video signals of red, green, and blue carrying video information, comprising: peak level detecting means for detecting a peak level of each of the three primary color video signals; and a level control circuit for controlling a signal level of each of the three primary color input video signals which are supplied to the inverse gamma correcting circuits in accordance with the detected peak levels, wherein the level control circuit performs a control operation in which the level of each of the three primary color input video signals which are supplied to the inverse gamma correcting circuits equals a peak value when the peak levels are equal to or larger than a predetermined value.

According to a second aspect of the invention, in the video signal processing circuit according to the first aspect of the invention, the level control circuit performs a control operation in which, when the peak levels are equal to or less than the predetermined value, the three primary color input video signals which are supplied to the inverse gamma correcting circuits are set to signal levels obtained by multiplying the three primary color video signals of red, green, and blue carrying the video information by a predetermined coefficient of "1" or more.

According to a third aspect of the invention, there is provided a video signal processing circuit comprising: a gain control amplifier which amplifies analog three primary color video signals of red, green, and blue indicative of video information by a predetermined gain and in which the gain is controlled by a gain control signal; analog/digital converter for converting the analog three primary color video signals which are generated from the gain control amplifier into digital signals; inverse gamma correcting circuits for effecting an inverse gamma correction to the three primary color digital video signals; a peak level detecting circuit for detecting a peak level of each of the analog three primary color video signals which are supplied to the analog/digital converters; and a gain control signal generator for generating the gain control signal in accordance with the detected peak levels, wherein the gain control signal generator generates the gain control signal to control the gain control amplifier so that when the peak level is equal to or larger than a predetermined value, a level of each of the three primary color digital video signals which are generated from the analog/digital converters is set to the peak value.

According to the fourth aspect of the invention, in the video signal processing circuit according to the third aspect of the invention, when the peak level is equal to or less than the predetermined value, the gain control signal generator generates the gain control signal so that the gain control amplifier amplifies the analog three primary color video signals by a predetermined gain of "1" or more.

According to the fifth aspect of the invention, there is provided a video signal processing circuit comprising: a matrix circuit to which an analog luminance signal and first and second analog color difference signals indicative of video information are supplied and which generates analog three primary color video signals of red, green, and blue; analog/digital converters for converting the analog three primary color video signals into digital signals; inverse gamma correcting circuits for effecting an inverse gamma correction to the three primary color digital video signals; a peak level detecting circuit for detecting a peak level of each of the analog three primary color video signals; and a level control circuit for controlling a signal level of the analog luminance signal in accordance with the detected peak level, wherein the level control circuit performs a control operation in which, when the peak level is equal to a predetermined value or more, the level of each of the three primary color digital video signals which are generated by the analog/digital converters is set to a peak value.

According to the sixth aspect of the invention, in the video signal processing circuit according to the fifth aspect of the invention, when the peak level is equal to or less than the predetermined value, the level control circuit performs a control operation in which the analog three primary color video signals which are supplied to the analog/digital converters is set to a signal level obtained by multiplying the analog luminance signal by a predetermined coefficient of "1" or more.

DETAILED DESCRIPTION OF THE PREFERRED EMBODIMENT

Figure 1:
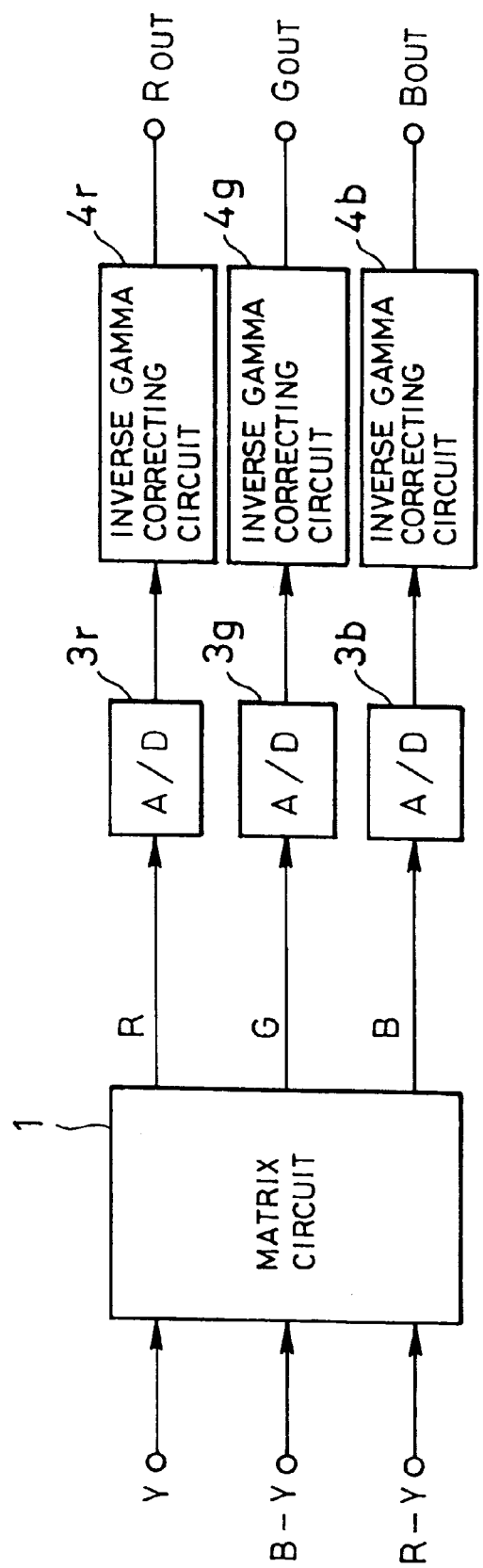
FIG. 1 is a diagram showing a conventional signal processing circuit.
Figure 3:
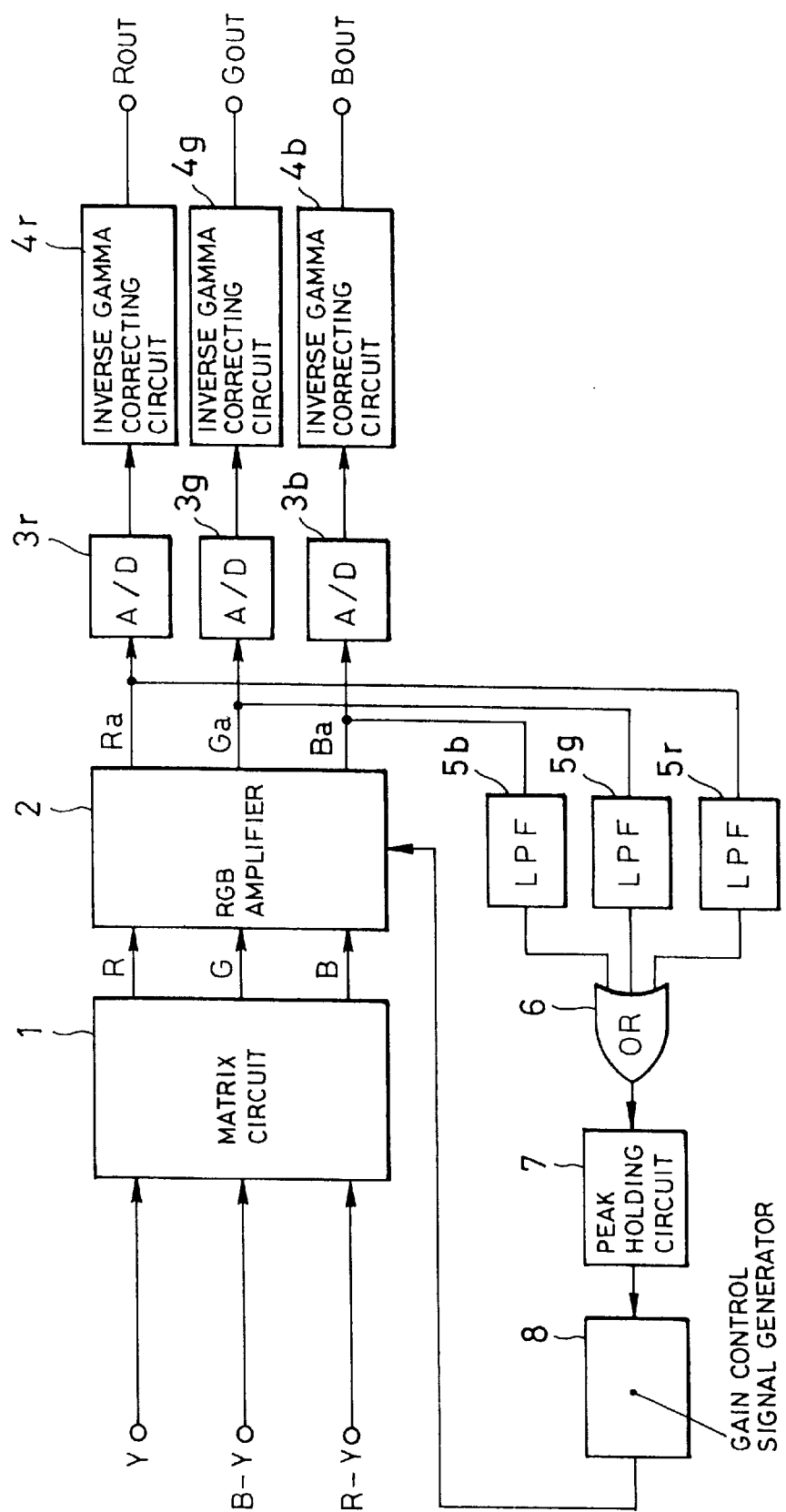
FIG. 3 is a diagram showing a signal processing apparatus according to an embodiment of the invention.

An embodiment of the invention will now be described hereinbelow with reference to the drawings. FIG. 3 shows an example of the structure of a signal processing circuit according to the invention. In this figure, the same reference numerals as those in FIG. 1 show the same component elements. Analog three primary color video signals of red (R), green (G), and blue (B) which are generated from the matrix circuit 1 are supplied to an RGB amplifier 2 as a gain control amplifier and are amplified by a predetermined gain, so that analog three primary color video signals Ra, Ga, and Ba are generated. The gain of the RGB amplifier 2 is controlled by a gain control signal which is generated from a gain control signal generator 8. The analog three primary color video signals Ra, Ga, and Ba generated from the RGB amplifier 2 are converted into digital signals by the A/D converters 3r, 3g, and 3b, and are processed by an inverse gamma correction at the inverse gamma correcting circuits 4r, 4g, and 4b, respectively.

The analog three primary color video signals Ra, Ga, and Ba from the RGB amplifier 2 are supplied to low pass filters (hereinafter, referred to as LPFs) 5r, 5g, and 5b, respectively. The OR of the signals passed through the LPFs is generated by an OR circuit 6. An output from the OR circuit 6 is supplied to a peak holding circuit 7, by which a peak value of the OR output is held. The peak value is supplied to the gain control signal generator 8 and a gain control signal according to the peak value is generated. The gain of the RGB amplifier 2 is controlled by the gain control signal.

In the construction, the analog three primary color video signals Ra, Ga, and Ba from the RGB amplifier 2 pass through the LPFs 5r, 5g, and 5b, thereby preventing that peak voltages at leading and trailing edges of the video signals which are caused by an outline correcting circuit are not generated. That is, a process for emphasizing the outline of the video signal is generally performed by the outline correcting circuit at the front stage of the present processing circuit. For example, the leading or trailing waveform of the video signal is projected by differentiating the video signal, thereby emphasizing the outline. If the signal at the leading or trailing edge, therefore, is regarded as a peak of the video signal and is held by the peak holding circuit 7, the peak levels of the analog three primary color video signals Ra, Ga, and Ba cannot be correctly detected, so that the contrast cannot be accurately controlled. By allowing the three primary color video signals Ra, Ga, and Ba to pass through the LPFs 5r, 5g, and 5b, the emphasized waveform due to the outline correcting circuit is blocked.

The OR of the outputs from the LPFs 5r, 5g, and 5b is obtained by the OR circuit 6 and the signal having the maximum level among the analog three primary color video signals Ra, Ga, and Ba is generated. This signal is held by the peak holding circuit 7 for a predetermined period (for example, a period of time of several fields) and the peak level of the analog three primary color video signals Ra, Ga, and Ba is held. The gain control signal generator 8 generates the gain control signal in accordance with the peak level, thereby controlling the gain of the RGB amplifier 2.

Figure 4:
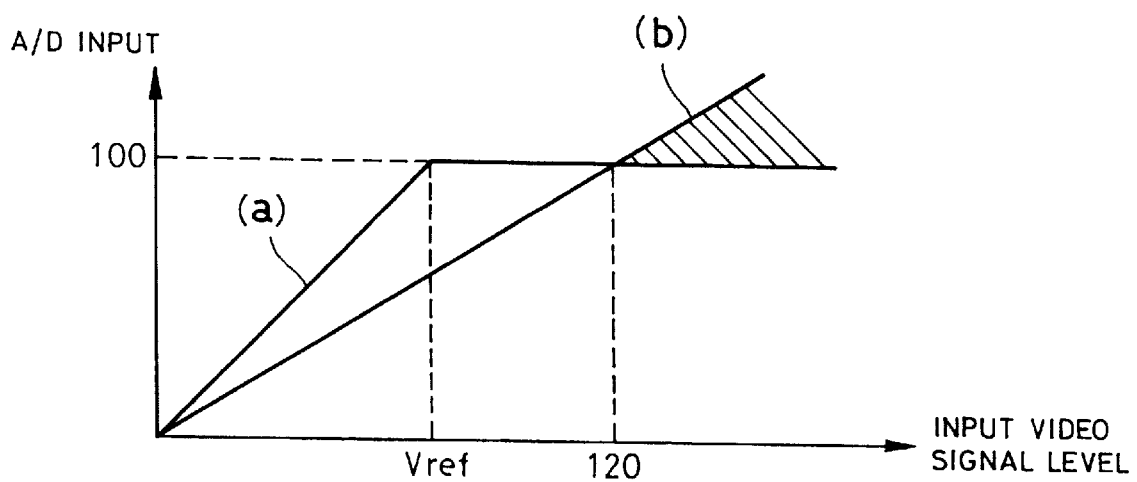
FIG. 4 is a graph showing characteristics of an input of an A/D converter to an input video signal in the circuit of the invention and the conventional circuit.

The gain control operation will now be explained hereinafter with reference to a characteristics graph shown in FIG. 4. FIG. 4 shows characteristics of the input signal which is supplied to each of the A/D converters 3r, 3g, and 3b for a signal level of an input video signal (Y). Characteristics (a) denote characteristics according to the processing circuit of the invention and characteristics (b) indicate characteristics according to the conventional circuit shown in FIG. 1.

In the characteristics (b) according to the conventional circuit, the three primary color signals R, G, and B which are supplied from the matrix circuit 1 to the A/D converters 3r, 3g, and 3b for the input video signals become linear characteristics. When the input video signal level reaches a predetermined value (120 in FIG. 4), the outputs from the A/D converters 3r, 3g, and 3b reach a peak value. The signal level (input of the A/D converter) of each of the three primary color signals R, G, and B is set to 100. When the signal of each of the A/D converters 3r, 3g, and 3b is constituted by 8 bits, the peak value is equal to "255". If the input video signal level lies in a range of "0" to "120" and the output of each of the A/D converters 3r, 3g, and 3b is not oscillated in a range of "0" to "the peak value" ("0" to "255"), therefore, since the characteristics of the inverse gamma correcting circuit are of the characteristics of an exponential function as mentioned above, deterioration of the contrast becomes remarkable.

When the input signal level exceeds the predetermined value "120", the characteristics are as shown in a range shown by a hatched portion in FIG. 4, so that the A/D conversion output Is saturated and a crushed image having no gradation is displayed.

The characteristics (a) indicate characteristics according to the processing circuit of the invention. The peak value in the three primary color signals Ra, Ga, and Ba according to the input signal level that is obtained by the peak holding circuit 7 is compared with a preset predetermined reference value Vref by the gain control signal generator 8. When the peak value is lower than the predetermined reference value Vref (peak value<Vref), the gain control signal is generated so that the RGB amplifier 2 has a predetermined gain larger than 1 (gain>1). The three primary color signals R, G, and B are amplified by the same gain, thereby generating the signals Ra, Ga, and Ba. When the peak value in the three primary color signals Ra, Ga, and Ba coincides with the predetermined reference value Vref, the gain of the RGB amplifier 2 is set by the gain control signal so that the outputs of the A/D converters 3r, 3g, and 3b are equal to the peak value by the input signals (Ra, Ga, Ba) of the A/D converters 3r, 3g, and 3b. For example, when the signal of each of the A/D converters 3r, 3g, and 3b is constituted by 8 bits, as mentioned above, the peak value of the output is equal to "255", so that the peak value "255" is generated by the input signals ("100") of the A/D converters 3r, 3g, and 3b.

When the peak value is eaual to or greater than the predetermined reference value Vref, the gain of the RGB amplifier 2 is decreased and the signal levels of the input signals (Ra, Ga, Ba) are limited so that the outputs of the A/D converters 3r, 3g, and 3b are always equal to the peak value (for example, "255"), thereby maintaining the levels constant.

Figure 2:
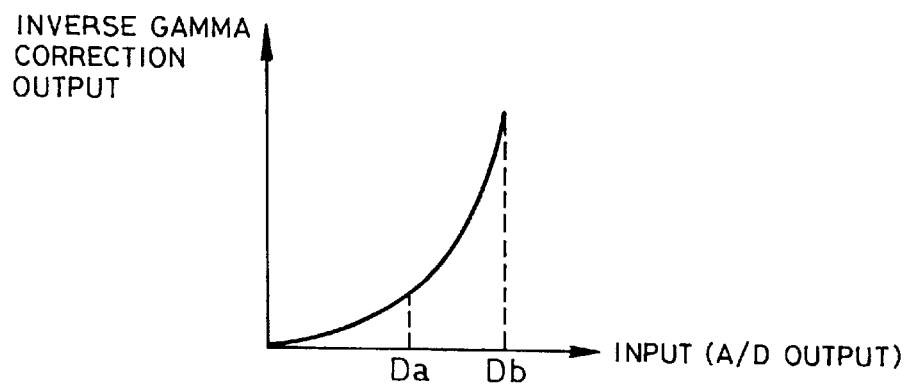
FIG. 2 is a graph showing input/output characteristics of an inverse gamma correcting circuit.

By showing the above operating characteristics, when the input video signal level is equal to or larger than the predetermined reference value, the outputs of the A/D converters 3r, 3g, and 3b are always equal to the peak value. The signal levels which are supplied to the inverse gamma correcting circuits 4r, 4g, and 4b at the post stage, consequently, are set to Db in FIG. 2 and the input signal level lies within a range of "0" to "the peak value", for example, in a range of "0" to "255" so long as the signal of each of the A/D converters 3r, 3g, and 3b is constituted by 8 bits, so that 100% of the dynamic range is utilized.

In a range where the input video signal is equal to or less than the predetermined reference value, since an image is displayed by the signals Ra, Ga, and Ba obtained by amplifying the three primary color video signals R. G. and B which are generated form the matrix circuit by the predetermined gain, the gradation of the video signal of low luminance or middle luminance increases and the luminance rises. The predetermined reference value Vref can be set to a fixed value or can be also manually varied by the user. In this case, when the user adjusts the contrast, the reference value Vref can be varied.

Figure 5:
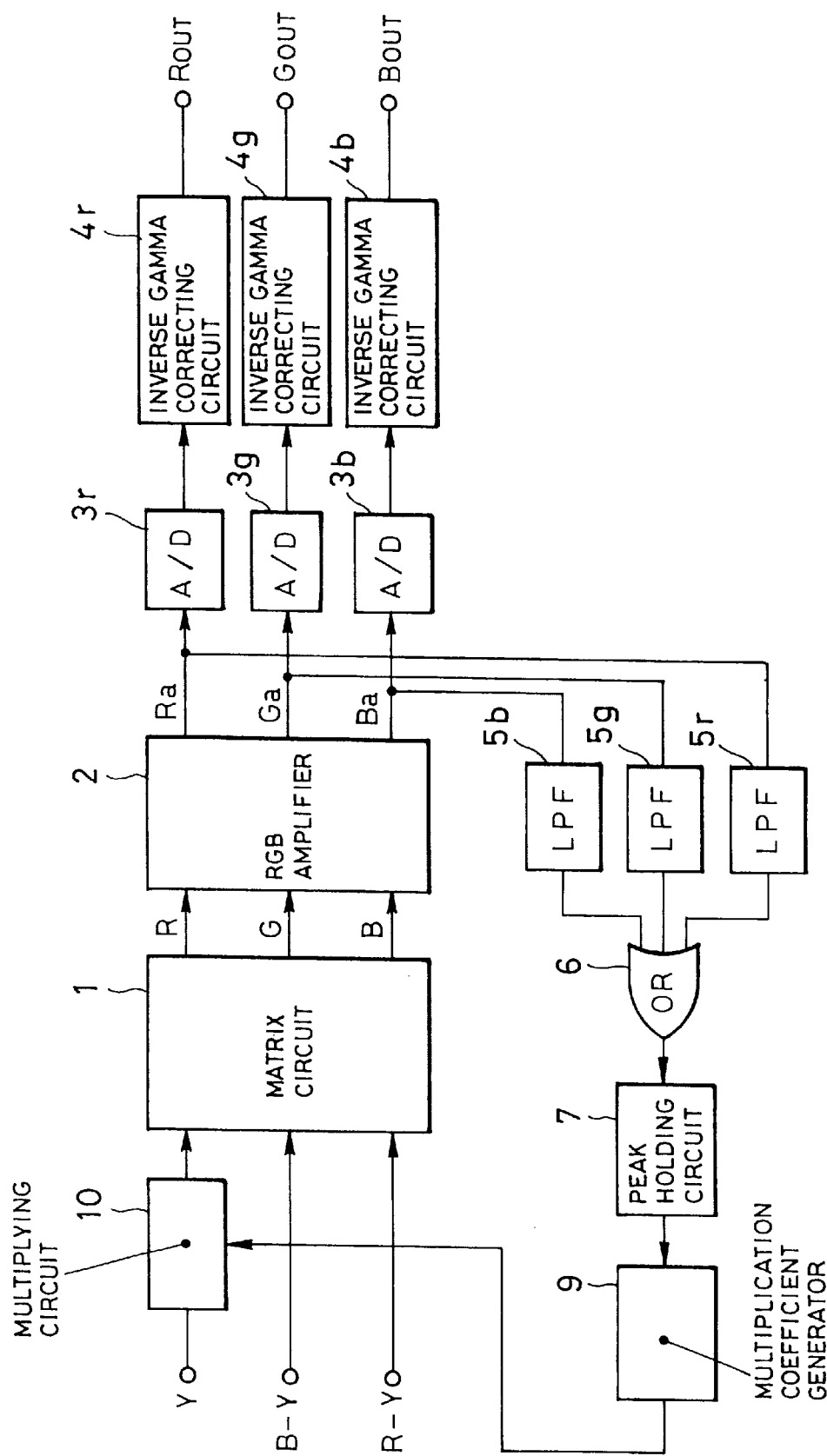
FIG. 5 is a diagram showing a signal processing apparatus according to another embodiment of the invention.

FIG. 5 shows another embodiment according to the invention and the same reference numerals as those in FIG. 1 denote the same component elements. In this diagram, the luminance signal Y representing the input video signal is supplied to the matrix circuit 1 through a multiplying circuit 10. A multiplication coefficient generator 9 generates a multiplication coefficient which is sent to the multiplying circuit 10 in accordance with the peak value from the peak holding circuit 7.

In this structure, as shown in FIG. 4, the peak value in the three primary color signals Ra, Ga, and Ba is compared with the predetermined reference value Vref by the multiplication coefficient generator 9. When the peak value is lower than the predetermined reference value Vref (peak value<Vref), a predetermined multiplication coefficient larger than 1 (multiplication coefficient>1) is generated and supplied to the multiplying circuit 10. The luminance signal Y is multiplied by the multiplication coefficient by the multiplying circuit 10 and the resultant signal is supplied to the matrix circuit 1. When the peak value in the three primary color signals Ra, Ga, and Ba is equal to or larger than the predetermined reference value Vref (peak value>Vref), such a multiplication coefficient smaller than 1 (multiplication coefficient<1) as to maintain the signal levels of the input signals (Ra, Ga, Ba) constant is generated so that the outputs from the A/D converters 3r, 3g, and 3b are always equal to the peak value. In the embodiment, since the levels of the input signals (Ra, Ga, Ba) of the A/D converters 3r, 3g, and 3b are controlled at the same rate as mentioned above, the contrast is controlled without deteriorating a white balance.

The display apparatus which is applied to the invention is not limited to the PDP. So long as the signal processing circuit in the display apparatus has the inverse gamma correcting circuit, the invention can also be applied to the other display apparatus by liquid crystal or a CRT.

As mentioned above, according to the invention, nearly 100% of the largest possible dynamic range can be utilized and desired contrast can be obtained. Desired brightness characteristics can be also obtained by an Increase in the maximum luminance of the screen.

What is claimed is:

1. A video signal processing circuit comprising:

peak level detecting means for detecting peak levels of three primary color video signals of red, green, and blue indicative of video information;

inverse gamma correcting circuits for effecting an inverse gamma correction to three primary color input video signals according to said three primary color video signals, respectively; and a level control circuit for controlling a signal level of each of said three primary color input video signals which are supplied to said inverse gamma correcting circuits in accordance with said detected peak levels, wherein when at least one of said peak levels is equal to or larger than a predetermined value, said level control circuit performs a control operation to set a level of each of the three primary color input video signals which are supplied to said inverse gamma correcting circuit to a peak value, and when the peak levels are less than the predetermined value, said level control circuit performs a control operation in which each of the three primary color input video signals which are supplied to said inverse gamma correcting circuit is set to a signal level obtained by multiplying each of the three primary color video signals of red, green, and blue representing said video information by a predetermined coefficient of "1" or more.

2. A video signal processing circuit comprising:

a gain control amplifier which amplifies each of analog three primary color video signals of red, green, and blue indicative of video information by a predetermined gain and in which said gain is controlled by a gain control signal;

analog/digital converters for converting said analog three primary color video signals which are generated from said gain control amplifier into digital signals, respectively;

inverse gamma correcting circuits for effecting an inverse gamma correction to said three primary color digital video signals, respectively;

a peak level detecting circuit for detecting a peak level of each of the analog three primary color video signals which are supplied to said analog/digital converters; and a gain control signal generator for generating said gain control signal in accordance with said detected peak levels, wherein when at least one of said peak levels is equal to or larger than a predetermined value, said gain control signal generator generates the gain control signal to control said gain control amplifier so as to set a level of each of the three primary color digital video signals which are generated from said analog/digital converters to a peak value.

3. A circuit according to claim 2, wherein when said peak levels are less than the predetermined value, said gain control signal generator generates the gain control signal such that said gain control amplifier amplifies each of said analog three primary color video signals by a predetermined gain of "1" or more.

4. A video signal processing circuit comprising:

a matrix circuit to which an analog luminance signal and first and second analog color difference signals indicative of video information are supplied and which generates analog three primary color video signals of red, green and blue;

analog/digital converters for converting said analog three primary color video signals into digital signals, respectively;

inverse gamma correcting circuits for effecting an inverse gamma correction to said three primary color digital video signals, respectively;

a peak level detecting circuit for detecting a peak level of each of said analog three primary color video signals; and a level control circuit for controlling a signal level of said analog luminance signal in accordance with said detected peak levels, wherein when at least one of said peak levels is equal to or larger than a predetermined value, said level control circuit performs a control operation to set a level of each of the three primary color digital video signals which are generated from said analog/digital converters to a peak value.

5. A circuit according to claim 4, wherein when said peak levels are less than the predetermined value, said level control circuit performers a control operation in which so that each of said analog three primary color video signals which are supplied to said analog/digital converters is set to a signal level obtained by multiplying said analog luminance signal by a predetermined coefficient of "1" or more.

* * * * *